United States Patent
Le Hong et al.

(10) Patent No.: US 9,920,638 B2
(45) Date of Patent: Mar. 20, 2018

(54) TURBINE OR COMPRESSOR STAGE INCLUDING AN INTERFACE PART MADE OF CERAMIC MATERIAL

(71) Applicant: SNECMA, Paris (FR)

(72) Inventors: Son Le Hong, Thomery (FR); Gael Frédéric Claude Cyrille Evain, Fontenay-Tresigny (FR); Didier Fabre, Avon (FR); Philippe Picot, Le Chatelet en Brie (FR)

(73) Assignee: SNECMA, Paris (FR)

( * ) Notice: Subject to any disclaimer, the term of this patent is extended or adjusted under 35 U.S.C. 154(b) by 542 days.

(21) Appl. No.: 14/320,911

(22) Filed: Jul. 1, 2014

(65) Prior Publication Data

US 2015/0010404 A1 Jan. 8, 2015

(30) Foreign Application Priority Data

Jul. 2, 2013 (FR) ...................... 13 56439

(51) Int. Cl.
*F01D 5/30* (2006.01)
*F04D 29/02* (2006.01)
*F04D 29/26* (2006.01)
*F04D 29/32* (2006.01)

(52) U.S. Cl.
CPC .......... *F01D 5/3084* (2013.01); *F01D 5/3023* (2013.01); *F01D 5/3069* (2013.01); *F04D 29/023* (2013.01); *F04D 29/26* (2013.01); *F04D 29/321* (2013.01); *F04D 29/322* (2013.01); *F05D 2230/22* (2013.01);
(Continued)

(58) Field of Classification Search
CPC ...... F01D 5/284; F01D 5/3007; F01D 5/3023; F01D 5/303; F01D 5/3084; F01D 11/008
See application file for complete search history.

(56) References Cited

U.S. PATENT DOCUMENTS 4,142,836 A * 3/1979 Glenn ..................... F01D 5/147
416/193 A
4,207,029 A 6/1980 Ivanko
(Continued)

FOREIGN PATENT DOCUMENTS

DE 24 58 268 B1 3/1976
EP 2 213 839 A2 8/2010
(Continued)

OTHER PUBLICATIONS

Dr. Dmitri Kopeliovich, Ceramics in combustion engines, Oct. 25, 2011, SubsTech, Wayback Machine.*
(Continued)

*Primary Examiner* — Richard Edgar
*Assistant Examiner* — John S Hunter
(74) *Attorney, Agent, or Firm* — Oblon, McClelland, Maier & Neustadt, L.L.P.

(57) ABSTRACT

A turbine or compressor stage for a turbine engine is provided. The stage includes a disk including a metal material configured to be coupled to a shaft of the turbine engine, an airfoil including a ceramic matrix composite material, and an interface part that is distinct from the airfoil and that is configured to be fastened to the disk and to fasten the airfoil. The interface part includes a ceramic or a ceramic matrix composite material.

8 Claims, 4 Drawing Sheets

(52) U.S. Cl.
CPC ..... *F05D 2300/6033* (2013.01); *Y02T 50/672* (2013.01); *Y02T 50/673* (2013.01)

(56) References Cited

U.S. PATENT DOCUMENTS

| | | | |
|---|---|---|---|
| 4,783,297 A * | 11/1988 | Ito | B22F 3/22 |
| | | | 264/645 |
| 4,790,723 A | 12/1988 | Wilson et al. | |
| 4,802,824 A | 2/1989 | Gastebois et al. | |
| 5,405,244 A | 4/1995 | Boyd | |
| 5,425,621 A | 6/1995 | Maar | |
| 5,431,541 A | 7/1995 | Shaffer | |
| 6,030,178 A * | 2/2000 | Caruso | F01D 5/3007 |
| | | | 416/191 |
| 7,284,958 B2 * | 10/2007 | Dundas | F01D 5/3007 |
| | | | 416/193 A |
| 7,874,804 B1 | 1/2011 | Brown | |
| 8,777,583 B2 * | 7/2014 | Darkins, Jr. | F01D 5/282 |
| | | | 416/191 |
| 9,328,622 B2 * | 5/2016 | Garcia-Crespo | F01D 5/3007 |
| 2010/0189556 A1 | 7/2010 | Propheter-Hinckley et al. | |
| 2013/0004296 A1 | 1/2013 | Propheter-Hinckley et al. | |

FOREIGN PATENT DOCUMENTS

| | | |
|---|---|---|
| EP | 2 570 600 A2 | 3/2013 |
| JP | 2-196105 A | 8/1990 |
| JP | 7-315949 A | 12/1995 |

OTHER PUBLICATIONS

French Preliminary Search Report dated Mar. 4, 2014 in French Application 13 56439, filed on Jul. 2, 2013 ( with English Translation of Categories of Cited Documents).

Search Report dated Jan. 8, 2015 in United Kingdom Patent Application No. GB1411727.9.

\* cited by examiner

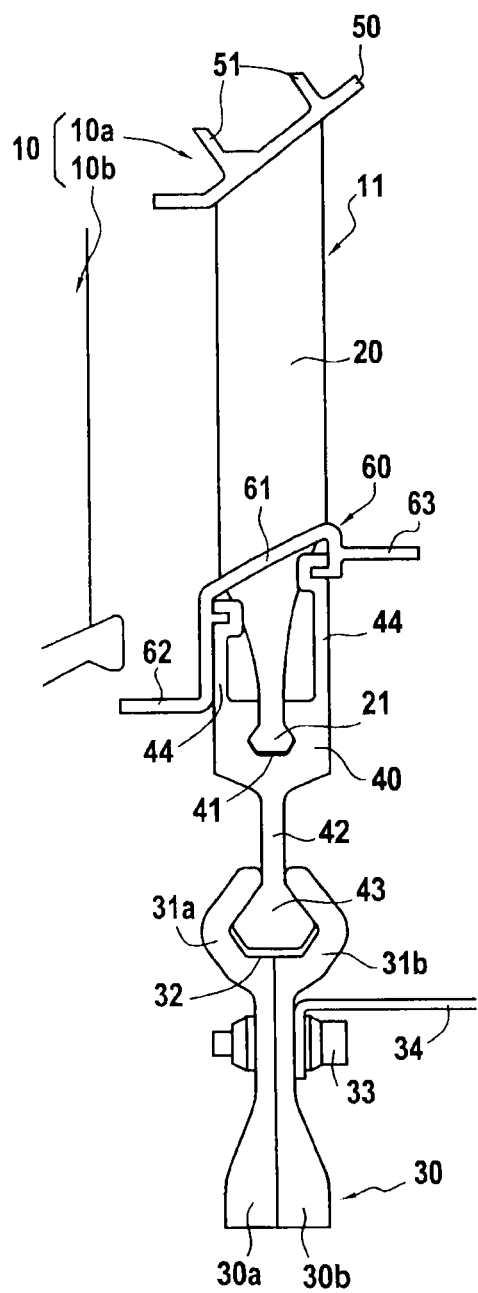
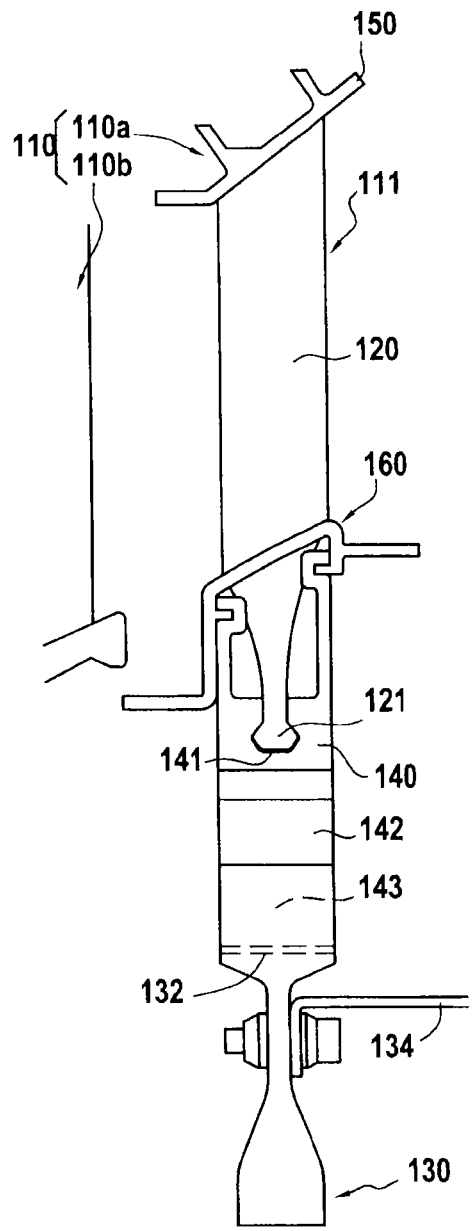

TURBINE OR COMPRESSOR STAGE INCLUDING AN INTERFACE PART MADE OF CERAMIC MATERIAL

FIELD OF THE INVENTION

The present description relates to a turbine or compressor stage and to a turbine engine including such a stage.

Such a turbine stage may be included in various types of turbine engine, and most particularly in airplane turbojets.

STATE OF THE PRIOR ART

In a conventional turbojet, the low pressure turbine generally comprises a plurality of stages, each comprising a wheel of metal blades mounted on a metal disk that is coupled to a shaft of the engine.

In order to save weight relative to the metal configuration, a large amount of research and development work has been engaged to design turbine blades out of ceramic matrix composite (CMC) material.

For example, designs have been proposed for single-piece bladed disks made of CMC material: nevertheless, at present, such designs are difficult to make and in particular they raise questions of mechanical strength.

In other designs, the blades are made of 3D-woven CMC material and they are fastened directly to the metal disk. Nevertheless, those designs encounter difficulties with fastening the blades to the disk. Firstly, it is found that chemical interactions between the woven composite material and the metal of the disk inflicts damage to the disk. Secondly, fastening the blades to the disk concentrates high levels of mechanical stress in a small area, thereby leading to mechanical damage. Furthermore, dimensional requirements are very severe in this zone, thereby complicating the design and the fabrication of such blades.

There therefore exists a real need for a turbine or compressor stage and for a turbine engine that do not suffer less or not at all from the drawbacks inherent to the above-mentioned configurations.

SUMMARY OF THE INVENTION

The present description relates to a turbine or compressor stage for a turbine engine, the stage comprising a disk configured to be coupled to a shaft of the turbine engine, and at least one airfoil, the disk comprising a metal material, the airfoil comprising a ceramic matrix composite material, and the stage also including an interface part that is distinct from the airfoil, which part is configured to be fastened to the disk and to fasten said at least one airfoil, said interface part comprising a ceramic or a ceramic matrix composite material.

In the present description, terms such as "longitudinal", "transverse", "bottom", "top", and their derivatives are defined relative to the main direction of the blade. Terms such as "axial", "radial", "tangential", "inner", "outer", and their derivatives are defined relative to the main axis of the turbine engine; and terms such as "upstream" and "downstream" are defined relative to the flow of air through the turbine engine.

This interface part makes it possible to solve a large number of difficulties that are conventionally encountered at the interface between a composite blade and a metal disk.

Firstly, it is possible to decouple certain functions that are usually performed by the blades by sharing them over different elements, and in particular firstly over the airfoil and secondly over the interface part, thereby providing greater freedom in optimizing the functions that are specific to each of these parts, in particular in terms of choice of materials. Thus, it is possible to choose a first material that is suitable for the airfoil and a second material that is suitable for the interface part: in particular, it is possible to select a material for the interface part that does not give rise to any harmful chemical interaction with the metal of the disk.

Furthermore, installing such an interface part serves to offset the interface zone between metal and composite material. In particular, it is possible to provide for the interface part to be fastened to the disk radially closer to the inside of the stage, where conditions are more favorable. The space available in this location is greater than in the immediate proximity of the airfoil, which is a zone that is very crowded with fastenings for all of the auxiliary members of the blade, such as the lips or the labyrinth seals, and by the presence of the inner ends of stator vanes: closer to the inside of the stage, there is thus more room for making a less complex metal/composite interface with a large surface area of contact. In addition, since the interface is further inside the stage, it is in a zone that is cooler, thereby providing thermomechanical conditions that are more favorable.

In addition, by means of this interface part, it is possible to provide a metal disk of small radius such that the use of metal is limited to zones that are cooler and that require high grade mechanical characteristics, whereas the ceramic and ceramic matrix composite (CMC) materials are used in the hotter zones.

It is thus also possible to benefit from a significant saving in weight, thereby contributing to reducing the specific consumption of the turbine engine.

In certain embodiments, the airfoil comprises a 3D-woven composite material. This type of material is particularly suitable for airfoils as a result of its weight and its mechanical and aerodynamic properties.

In certain embodiments, said interface part comprises a ceramic material, at least in its zone in contact with the disk. The inventors have found that using such a ceramic material enables the interface between the interface part and the metal disk to be more healthy. Such a ceramic material is also easier to machine than woven composite materials, thus making it possible to comply with stricter dimensional constraints.

In certain embodiments, the interface part is a single piece comprising ceramic material. This provides a part that is coherent and that has good mechanical strength properties.

In other embodiments, the interface part comprises a first portion of 3D-woven composite material and a second portion of ceramic material, the interface part being configured so that the first portion is not in contact with the disk. This makes it possible to benefit from the properties of the woven material, in particular its mechanical properties, while providing a healthy interface between the ceramic material and the metal of the disk.

In certain embodiments, the interface part comprises a ceramic material reinforced by a central insert made of 3D-woven composite material.

In other embodiments, the interface part comprises a main part of 3D-woven composite material having a contact portion of ceramic material fitted thereto, at least in the zone that comes into contact with the disk. This contact portion is preferably brazed onto the main part.

In certain embodiments, the stage also includes at least one inner platform made of ceramic or ceramic matrix composite material. These platforms that are arranged in the space between blades serve to define the airflow passage and to ensure that the air flows aerodynamically while avoiding leaks. In addition, these platforms serve to isolate the inner portion of the stage from the flow of air and they thereby form a heat shield for the inner portion.

The material of the platform is preferably a ceramic material. It is thus easy to make the platform even when its shape is fine or complex.

In certain embodiments, the stage also has at least one lip of ceramic or of ceramic matrix composite material. Such lips, directed towards the upstream and/or downstream stator vanes of the stage serve to isolate the inner portion of the stage from the flow of air and to provide a heat shield. In addition, they help in reducing leaks, which is beneficial for the performance of the turbine.

The material of the lips is preferably a ceramic material. It is then easy to make the lips even when their shape is fine or complex.

In certain embodiments, the stage further comprises at least one low wall or cheekplate of ceramic material or of CMC material. In such embodiments, these walls or cheekplates serve to retain the platform and to isolate the root of the airfoil. They also serve to provide sealing against leaks between blades. This material is preferably a ceramic material.

In certain embodiments, said platforms, lips, low walls, and/or cheekplates are secured to the interface part by any appropriate method. In particular they may be brazed.

In other embodiments, said platforms, lips, low walls, and/or cheekplates form integral portions of the interface part.

In certain embodiments, the disk does not have ventilation. This is made possible by using ceramic and CMC materials in the hottest portions that are close to the flow of air. Reducing or eliminating such ventilation constitutes a significant improvement in the performance of the turbine.

In certain embodiments, the stage also includes an outer platform of ceramic material or ceramic matrix composite material at the outer end of said airfoil, and preferably made of CMC material.

In certain embodiments, the outer platform includes at least one sealing portion configured to rub in sealing manner against an abradable track of the stator of the turbine engine.

In certain embodiments, the platform is fitted on the tip of the blade, preferably by brazing.

In other embodiments, the outer platform is formed integrally on the tip portion of the airfoil. By way of example, it may then be made by weaving one or more crossings through the airfoil using techniques that are known in the art.

The top connection between the airfoil and the interface part may be constituted by a hammer attachment, a shank attachment, or by mere juxtaposition. This connection is preferably brazed and it may be reinforced by inserting by a peg.

The bottom connection between the interface part and the disk may be constituted by a hammer attachment, a shank attachment, or a bolted connection.

In certain embodiments, the interface part includes a fastener portion projecting towards the disk, and the disk comprises two half-disks with outer segments configured so as to co-operate with the fastener portion of the interface part so as to fasten it to the disk, the two half-disks being held pressed one against the other, preferably by bolting.

In certain embodiments, the interface part has a fastener portion that is generally dovetail-shaped, and the two half-disks possess outer segments that co-operate to form a cavity in which the fastener portion of the interface part is clamped in order to fasten the interface part to the disk.

In other embodiments, the interface part includes a fastener tab, and the two half-disks possess outer segments that are configured in such a manner as to lie on either side of the fastener tab of the interface part, the two half-disks and the fastener tab being fastened together by bolting or by inserting a peg.

In other embodiments, the interface part has a fastener portion that is generally dovetail-shaped, and the disk includes at least one axial, transverse slot in which the fastener portion of the interface part is inserted in order to fasten it to the disk. This thus constitutes a shank attachment. Under such circumstances, the disk may be a single piece.

In certain embodiments, the airfoil is extended at its inner end by a fastener portion, and the interface part includes a socket into which the fastener portion of the airfoil is engaged, the fastener portion being fastened in the socket by a retaining element inserted through said fastener portion and through at least a portion of the interface part. This retaining element is preferably a peg, and it may also be brazed.

In other embodiments, the airfoil has a fastener portion that is generally dovetail-shaped, and the interface part includes a slot in which the fastener portion of the airfoil is inserted in order to fasten it to the interface part. The slot may be axial or tangential, i.e. the connection may be of the shank type or of the hammer type. The fastener portion of the airfoil may also be brazed in said slot.

In certain embodiments, the interface part is configured to fasten only one airfoil.

In other embodiments, the interface part is configured to fasten a plurality of airfoils: it may thus constitute a doublet or a wheel sector.

In certain embodiments, the ceramic material constituting certain parts of the stage is a molded and sintered material. This enables these small parts to be made quickly and easily, even though they are often fine and complex in shape.

The present description also relates to a turbine engine having at least one turbine or compressor stage in accordance with any of the embodiments described above.

The above-mentioned characteristics and advantages, and others, appear on reading the following detailed description of embodiments of the proposed stage and turbine engine. This detailed description makes reference to the accompanying drawings.

BRIEF DESCRIPTION OF THE DRAWINGS

The accompanying drawings are diagrammatic and seek above all to illustrate the principles of the invention.

In the drawings, from one figure to another, elements (or portions of an element) that are identical, are identified by the same reference sign. In addition, elements (or portions of elements) belonging to different embodiments and that are analogous in function, are identified in the figures by numerical references incremented by 100, 200, etc.

FIG. 2 is an axial section view of a first example of a stage of the invention.

FIG. 3 is an axial section view of a second example of a stage of the invention.

DETAILED DESCRIPTION OF EMBODIMENTS

In order to make the invention more concrete, examples of turbine stages of a turbine engine are described in detail below with reference to the accompanying drawings. It should be recalled that the invention is not limited to these examples.

Figure 1:
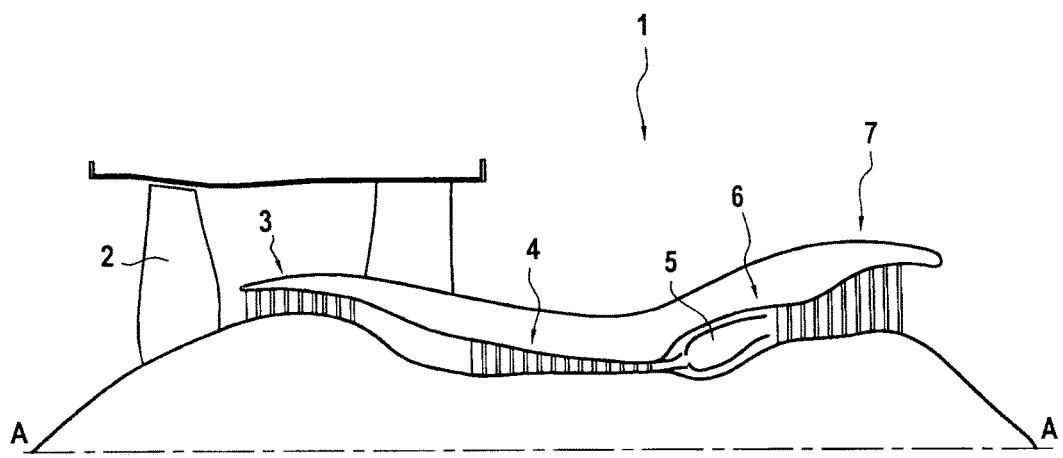
FIG. 1 is an axial section view of an example of a turbojet.

FIG. 1 is a section view on a vertical axial plane containing the main axis A of a bypass turbojet 1 of the invention. From upstream to downstream it comprises a fan 2, a low pressure compressor 3, a high pressure compressor 4, a combustion chamber 5, a high pressure turbine 6, and a low pressure turbine 7.

FIG. 2 is a section view on the same axial plane showing a portion of the low pressure turbine 7. This turbine 7 comprises a plurality of stages 10 in a first embodiment, each comprising a rotor 10a and a stator 10b following one after the other from upstream to downstream. Each rotor 10a comprises a plurality of rotor blades 11, each comprising an airfoil 20 and an interface part 40 that are mounted on a disk 30, which is coupled to a shaft of the bypass turbojet 1.

Each airfoil 20 is made of 3D-woven ceramic matrix composite (CMC) material. At its bottom end, the airfoil 20 has a dovetail-shaped fastener portion 21.

Each interface part 40 is made of ceramic material. Each interface part 40 includes at its top end a slot 41 of shape complementary to the shape of the dovetail-shaped fastener portion 21 of the airfoil 20, and at its bottom end it includes a rod 42 terminating in a fastener portion 43 that is likewise dovetail-shaped.

The disk 30 is made of metal. It comprises two half-disks 30a and 30b arranged one against the other. The outer end segment 31a, 31b of each half-disk 30a, 30b is spaced apart from the adjacent half-disk 30a, 30b so as to be C-shaped in order to co-operate with the adjacent half-disk 30b, 30a to form a cavity 32.

Thus, the airfoil 20 is mounted on the interface part 40 by means of its fastener portion 21 that is engaged and brazed in the slot 41 in the interface part 40. The interface part 40 is itself mounted on the disk 30 by its fastener portion 43 being clamped within the cavity 32 by the outer segments 31a and 31b of the half-disks 30a and 30b, which disks are held pressed against each other by means of a bolted connection 33.

The disks 30 of each stage 10 are also connected to one another in pairs by metal shrouds 34 that are bolted to the disks 30. Advantageously, such shrouds 34 are fastened to the bolted connection 33 between the two half-disks 30a and 30b.

The blade 11 also has an outer platform 50 made of woven CMC material that is attached to the airfoil 20 by brazing. It could equally well be made of ceramic material. The outer platform 50 has wipers 51 configured to rub against an abradable track of the stator of the turbine 7 so as to provide the rotor 10a with sealing relative to the stator.

The blade 11 also has an inner platform 61 with upstream and downstream lips 62 and 63 made as a single piece 60 of woven CMC material fitted on the interface part 40 by brazing. It could equally well be made of ceramic material. In this embodiment, the part 60 constituting the platform 61 and the lips 62 and 63 is attached via low walls 44 of the interface part 40 that extend radially outwards so as to be located on either side of the non-airfoil bottom portion of the airfoil 20 leading to the fastener portion 21.

FIG. 3 is a section in the same axial plane showing a portion of a second example of the low pressure turbine 7. This turbine 7 has a plurality of stages 110 in a second embodiment. In manner identical to the first example, each rotor 110a has a plurality of rotor blades 111, each comprising an airfoil 120 and an interface part 140 mounted on a disk 130 that is coupled to a shaft of the bypass turbojet 1. Only the differences with the first example are described in detail.

Unlike the first example, which presents a "hammer" type attachment, this second example presents a "shank" type attachment.

In this second example, the dovetail 143 of the interface part 140 extends axially and no longer tangentially.

The disk 130 is then made as a single piece, and in the vicinity of its outline it includes axial slots that are configured to receive the dovetail-shaped ends 143 of the interface part 140.

The two above-described configurations are only two embodiments, and they may be subjected to numerous variations.

Figure 4A:
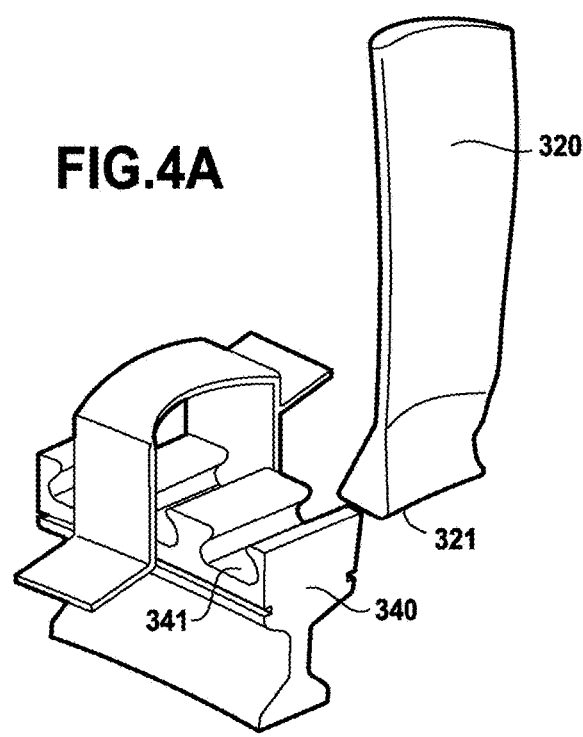
FIGS. 4A, 4B and 4C show variant embodiments of the fastening of the airfoil on the interface part.

In particular, in the first-described example, the airfoil 20 is mounted on the interface part 40 with the help of a fastener portion 21 having its dovetail oriented tangentially so as to engage in the tangential slot 41 in the interface part 40: this is a hammer-type attachment. Nevertheless, as shown in FIG. 4A, the dovetail of the fastener portion 321 of the airfoil 320 could equally well be oriented radially; under such circumstances, the slot 341 in the interface part 340 is also oriented radially: this thus constitutes a shank-type attachment.

Figures 4B, 4C:
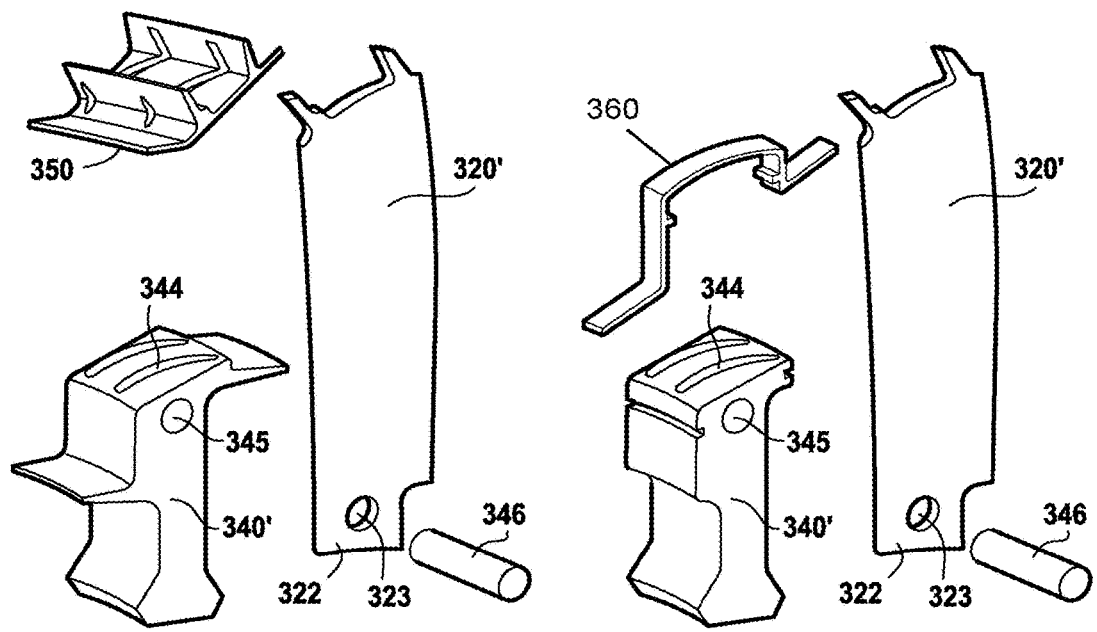

In another variant shown in FIGS. 4B and 4C, the airfoil 320' does not have a dovetail-shaped fastener portion. Instead of that, it has a fastener tab 322 extending the bottom portion of the airfoil 320' with unchanging profile; this fastener tab 322 is also provided with a through orifice 323. The interface part 340' does not have a slot, but rather a radial socket 344 of shape complementary to the fastener tab 322 of the airfoil 320'; a through orifice 345 passes through the interface part 340' and the socket 344. Under such circumstances, the airfoil 320' engages in the socket 344 of the interface part 340': a peg 346 is then inserted through the orifices 345 in the interface part 340' and 323 in the fastener tab 322 of the airfoil 320' in order to fasten the airfoil to the interface part 340'. The peg 346 is then brazed in position. An outer platform 350 may be fitted to radially outer end of the airfoil 320'. A part 360 may be fitted on the interface part 340'.

Figure 5A:
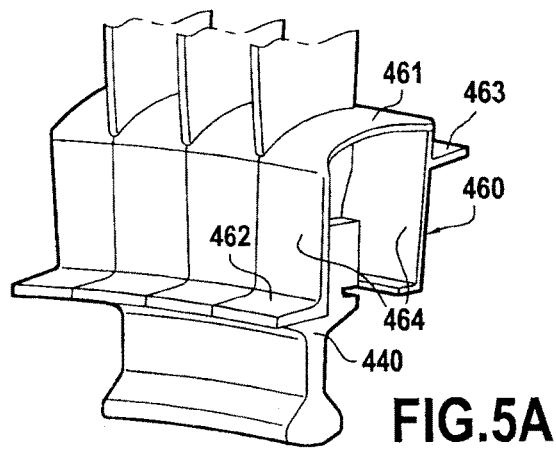
FIGS. 5A and 5B show variant embodiments of the platform and of the lips.

Certain variants relate to the inner platform and the lips. In the two examples described, a single part 60 serves to provide the inner platform 61 and the lips 62 and 63 of the blade 11, this part 60 being fastened to the low wall 44 of the interface part 40. Nevertheless, as shown in FIG. 5A, in addition to the inner platform 461 and the lips 462 and 463, such a part 460 could also include upstream and downstream vertical portions 464 acting as low walls and fastened to the body proper of the interface part 440.

Figure 5B:
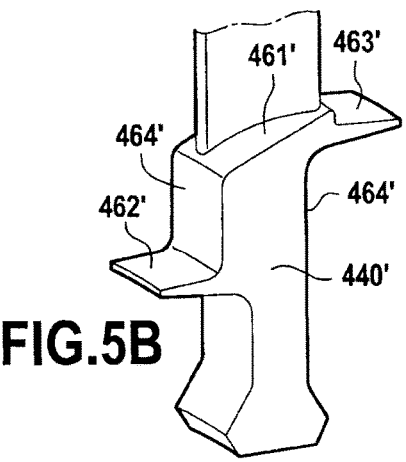

In another variant, shown in FIG. 5B, the interface part 440' may be made integrally with portions 461', 462', 463', and 464' that correspond respectively to the inner platform, to the upstream lip, to the downstream lip, and to the low walls.

Figure 6A:
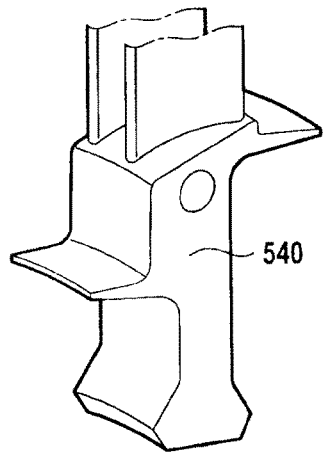
FIGS. 6A, 6B, and 6C show variant embodiments of the structure of the interface part.
Figure 6B:
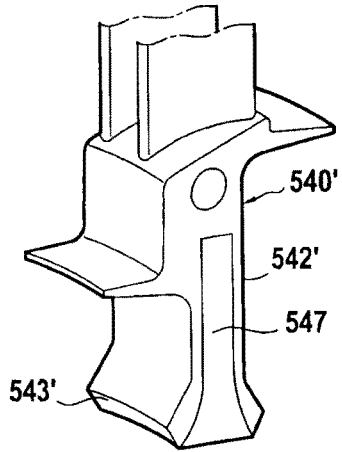

Other variants relate to the structure of the interface part itself. In the two examples described, as in the example of FIG. 6A, the interface part 540 is made entirely out of ceramic material. Nevertheless, and as shown in FIG. 6B, the interface part 540' could equally well have reinforcement 547 made of woven CMC material: this reinforcement 547 is substantially in the form of a plate extending tangentially over the entire length of the interface part 540' and radially at least along the rod 542' and in part within the body of the interface part 540'. The other portions of the interface part 540', and in particular the flanks of the rod 542' and the fastener portion 543' are made of ceramic material.

Figure 6C:
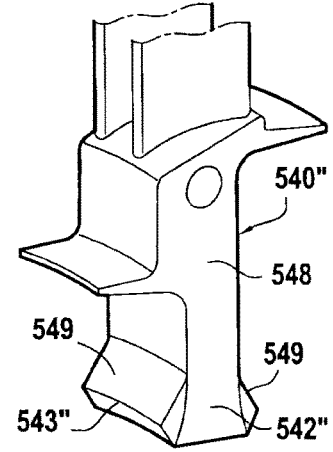

In another variant shown in FIG. 6C, the interface part 540" has a first portion 548 forming the body and the rod 542" of the interface part 540" and made of 3D-woven CMC material. The interface part 540" then includes a second portion made up of two bearing surfaces 549 fitted to opposite sides of the rod 542" on its fastener portion 543", these bearing surfaces 549 being made of ceramic material.

Figure 7A:
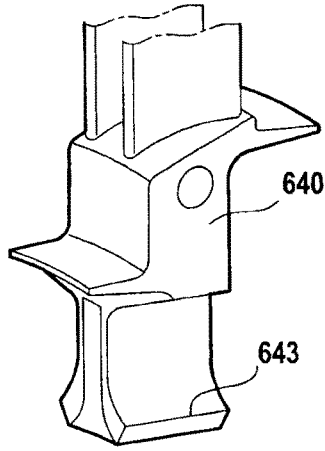
FIGS. 7A, 7B, and 7C show variant embodiments of the fastener portion of the interface part.

Finally, other variants relate to fastening the interface part on the disk. In the first embodiment described as shown in FIG. 2, the interface part 40 is mounted on the disk 30 with the help of a fastener portion 43 having its dovetail oriented tangentially so as to engage in the tangential slot 32 formed by the half-disks 30a and 30b: this constitutes a hammer-type attachment. Nevertheless, as in the second described example from FIG. 3 and as shown in FIG. 7A, the dovetail of the fastener portion 643 of the interface part 640 could equally well be radially oriented, and then the disk may be a single piece provided with radially oriented slots: this constitutes a shank-type attachment.

Figure 7B:
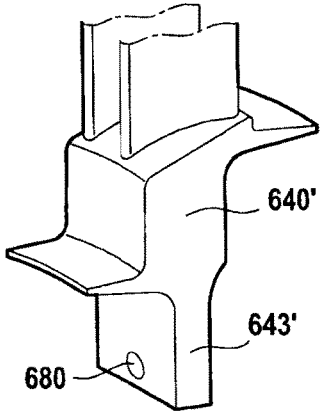

In the variant shown in FIG. 7B, the interface part 640' does not have a fastener portion but includes a fastener tab 643' suitable for being inserted in a U-shaped cavity in the disk; the fastener tab 643' then has a through orifice 680 for passing the bolt.

Figure 7C:
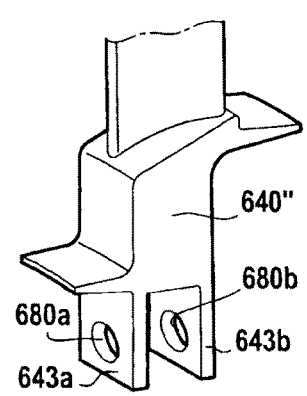

Nevertheless, in the variant shown in FIG. 7C, the interface part 640" could have two fastener tabs 643a and 643b, each having a through orifice 680a, 680b suitable for being fastened to the disk by bolting.

The embodiments described in the present description are given by way of non-limiting illustration, in the light of this description, and the person skilled in the art can easily modify these embodiments or can envisage others, while remaining within the scope of the invention.

Furthermore, the various characteristics of the embodiments may be used singly or in combination with one another. When combined, these characteristics may be combined as described above or in other ways, the invention not being limited to the specific combinations described in the present description. In particular, unless specified to the contrary, any characteristic described in relation with one particular embodiment may be applied in analogous manner to another embodiment.

The invention claimed is:

1. A turbine or compressor stage for a turbine engine, the turbine or compressor stage comprising:
   a disk configured to be coupled to a shaft of the turbine engine; and
   at least one airfoil having a fastener portion at a radially inner end,
   wherein the disk comprises metal material,
   wherein the at least one airfoil comprises ceramic matrix 3D-woven composite material,
   wherein the turbine or compressor stage further includes an interface part distinct from the at least one airfoil and configured to be fastened to the disk and to fasten said at least one airfoil so as to form an interface between the disk and the at least one airfoil, the interface part including a slot in which the fastener portion of the at least one airfoil is inserted in order to fasten the fastener portion of the airfoil to the interface part, and walls located on upstream and downstream ends of the interface part, the walls extending radially outward, and
   a piece of ceramic or ceramic matrix 3D-woven composite material distinct from the at least one airfoil and distinct from the interface part, the piece of ceramic or ceramic matrix 3D-woven composite material being attached to the walls located on the upstream and downstream ends of the interface part, the piece of ceramic or ceramic matrix 3D-woven composite material including an inner platform, an upstream lip, and a downstream lip, the downstream lip being radially outward of the upstream lip, and
   wherein the interface part comprises a ceramic material, at least in a zone of the interface part in contact with the disk.

2. A turbine or compressor stage according to claim 1, wherein the interface part is a single piece comprising ceramic material.

3. A turbine or compressor stage according to claim 1, wherein the interface part comprises a first portion of ceramic matrix 3D-woven composite material and a second portion of ceramic material, the interface part being configured so that the first portion is not in contact with the disk.

4. A turbine or compressor stage according to claim 1, wherein the interface part includes a fastener portion projecting towards the disk, and wherein the disk comprises two half-disks with outer segments configured so as to co-operate with the fastener portion of the interface part so as to fasten the fastener portion of the interface part to the disk, the two half-disks being held pressed one against the other.

5. A turbine or compressor stage according to claim 1, wherein an inner end of the at least one airfoil is extended by the fastener portion, and wherein the interface part includes a socket into which the fastener portion of the at least one airfoil is engaged, the fastener portion of the at least one airfoil being fastened in the socket by a retaining element inserted through said fastener portion of the at least one airfoil and through at least a portion of the interface part.

6. A turbine or compressor stage according to claim 1, wherein parts of the turbine or compressor stage comprise ceramic material which is molded and sintered.

7. A turbine engine, including at least one turbine or compressor stage according to claim 1.

8. A turbine or compressor stage according to claim 1, wherein an outer platform of the at least one airfoil includes an upstream wiper and a downstream wiper, a free end of the downstream wiper being radially outward of a free end of the upstream wiper.

* * * * *